Sept. 11, 1951
H. L. HORWITZ
2,567,209
TELEPHONE METERING SYSTEM
Filed Aug. 10, 1946
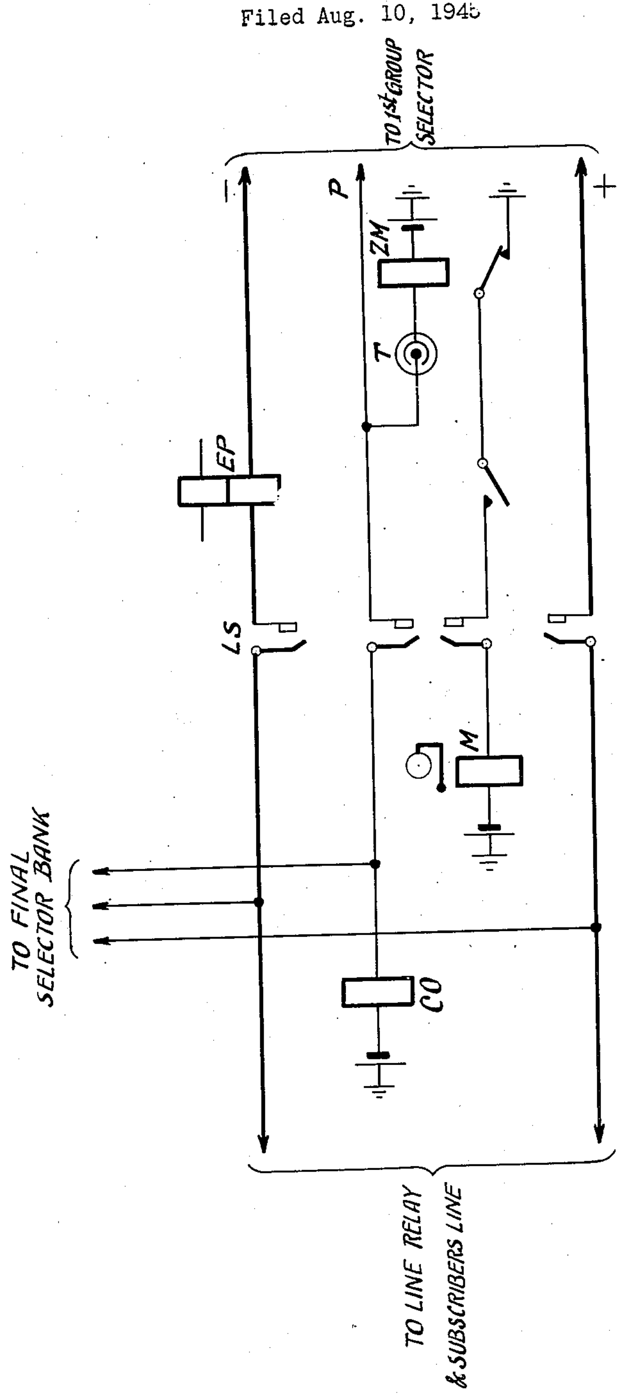
INVENTOR
Henry L. Horwitz
BY Robert Harding Jr.
ATTORNEYS Patented Sept. 11, 1951

2,567,209

UNITED STATES PATENT OFFICE 2,567,209

TELEPHONE METERING SYSTEM

Henry L. Horwitz, Jamaica, N. Y., assignor to Federal Telephone and Radio Corporation, New York, N. Y., a corporation of Delaware Application August 10, 1945, Serial No. 610,105

3 Claims. (Cl. 179—9)

This invention relates to telephone metering system, particularly to an arrangement for metering subscribers' calls, and has for an object to adapt zone metering to a reversed battery metering circuit.

Another object of the invention is to provide a metering circuit adaptable for registering telephone calls to a plurality of zones.

Still another object of the invention is to provide a message register circuit that is adapted to register both local and distant calls.

With the above objects in view, one embodiment of the invention discloses a message register circuit for a step-by-step system in which completed local calls are characterized by the conventional reversal of battery while distant office calls are characterized by a plurality of impulses, depending upon the number of local units to be charged, the message register or meter being rendered effective first by operation of a polarized relay in response to the reversed battery and then released and reoperated through a back contact of a relay energized by ionization of a neon tube in response to an impulse.

A more complete understanding of the invention will be obtained from the following description of a preferred embodiment thereof, taken in conjunction with the accompanying drawing, which schematically shows a message register circuit interposed between a calling subscriber's line and a first group selector of an automatic telephone step-by-step system.

Referring now to the drawing, there is shown an electro-polarized relay EP of the usual type having one winding thereof interposed between a line switch LS and a first group selector (not shown) in conductor—. While a line switch LS has been shown, it is, of course, understood that a line finder may be used in its stead. Relay EP is so polarized that it will operate only upon a positive potential being impressed upon conductor —, which reversal of potential occurs in the conventional manner, namely, upon the called subscriber answering. Since the circuit details illustrating the reversal of battery for a step-by-step system are well-known, they have been omitted in order to simplify the drawing. It is merely noted that the electro-polarized relay EP remains operated during the conversational period between the calling and called subscribers.

Upon the electro-polarized relay EP being energized, thereby indicating completion of a talking circuit, a message register or meter M is energized to register the call, such as by a single charge unit. However, to take care of a talking circuit that has been extended beyond the range or zone of a local call area, a zone metering circuit including a relay ZM is serially connected with a space discharge tube, such as a cold cathode or neon tube T, to release trunk conductor P. To the release trunk conductor P is adapted to be connected from a connecting repeater (not shown) a booster battery potential (not shown) of a predetermined higher voltage which, upon being impressed upon the neon tube T, ionizes it to function as a trigger device and thereby close a conducting path for relay ZM. A circuit (not shown) for transmitting impulses of the booster battery potential is rendered effective in accordance with the number of local call units to be charged to the subscriber. In other words, if a subscriber is to be charged three local call units for his particular call, two impulses of the booster battery potential will be transmitted to the message register circuit and cause the meter M to register two additional call units.

In operation, let it first be assumed that a connection has been made to a called subscriber within the same local zone as the calling subscriber. In this instance, upon the called subscriber answering, reversal of battery occurs in the conventional manner over the +, — conductors and relay EP becomes energized. Upon operation of relay EP, its make contact closes a circuit for meter M, which may be traced from ground through break contact of relay ZM, make contact of relay EP, intermediate contact of line switch LS, and thence through winding of meter M to grounded battery. Meter M remains operated during the period of conversation and releases upon conclusion thereof.

Let it next be assumed that the call is extended to a distant office. Relay EP will operate in the same manner as for a local call, namely, upon reversal of battery, meter M being operated in the above-traced circuit to register a single charge unit. Assuming further that the distant office to which the calling subscriber is connected requires a further two unit charge, two spaced impulses will be transmitted from a booster battery (not shown) of a connecting repeater (not shown). These impulses are transmitted over the release trunk conductor P, through neon tube T, which, in view of the higher potential, breaks down and ionizes, thereby producing a conducting path therethrough for the first impulse of current, which continues through winding of relay ZM to ground. Upon operation of relay ZM, its break contact opens the above-traced circuit for meter M, which releases. However, immediately upon completion of the first impulse i. e., disconnection of booster battery potential, the normal exchange battery impressed upon the neon tube T is insufficient to sustain it in an ionized condition and, therefore, relay ZM releases. The break contact of relay ZM retracts to reclose the circuit for meter M, which, upon energization, registers a second call unit. Upon transmittal of the second impulse the above procedure is repeated, meter M again registering a call unit, namely, the third unit. It is thus readily apparent that distant calls may be registered by the application of applicant's invention to a conventional battery reversal system for registering local calls.

While the features of this invention have been disclosed with reference to the specific embodiment shown, it is, of course, understood that various modifications may be made in the details thereof without departing from the scope of this invention as defined in the appended claims.

What is claimed is:

1. In an automatic telephone system having a pair of line conductors and a release trunk conductor, a message register circuit comprising a message register, means including an electro-polarized relay connected in the circuit of said line conductors and having contacts controlled by said relay for actuating said message register when the current in said pair of conductors is reversed, and separate means connected to said release trunk conductor and responsive to voltage pulses on said release trunk conductor for additionally actuating said message register while said relay is operated to actuate said message register.

2. In a step-by-step telephone system having a pair of line conductors and a release trunk conductor, a message register circuit comprising an electro-polarized relay connected in the circuit of said line conductors and having contacts controlled by said relay, a message register connected to the contacts of said relay and steadily responsive to said relay for registering a local call unit, and means including a space discharge tube connected to said release trunk conductor and responsive to voltage pulses of a predetermined value on the release trunk conductor for releasing and reoperating said message register while said relay is operated to actuate said message register, thereby causing said message register to record additional call units.

3. In a step-by-step telephone system, the combination, as defined in claim 2, in which the means for releasing and reoperating the message register includes a relay in the circuit of the space discharge tube, said relay having contacts in the circuit of said message register.

HENRY L. HORWITZ.

REFERENCES CITED

The following references are of record in the file of this patent:

UNITED STATES PATENTS

| Number | Name | Date |
|---|---|---|
| 2,025,880 | McDavitt | Dec. 31, 1935 |
| 2,060,261 | Stokely | Nov. 10, 1936 |
| 2,103,441 | Wollack | Dec. 28, 1937 |
| 2,141,463 | Dohle | Dec. 27, 1938 |
| 2,271,072 | Hallingan et al. | Jan. 27, 1942 |